US011989109B2

(12) United States Patent
Mukherjee et al.

(10) Patent No.: US 11,989,109 B2
(45) Date of Patent: May 21, 2024

(54) MANAGING POWER CONSUMPTION FOR A COMPUTING CLUSTER

(71) Applicant: Dell Products L.P., Round Rock, TX (US)

(72) Inventors: Rishi Mukherjee, Bangalore (IN); Ravishankar N. Kanakapura, Bangalore (IN); Prasoon Kumar Sinha, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 18/046,040

(22) Filed: Oct. 12, 2022

(65) Prior Publication Data

US 2024/0126669 A1 Apr. 18, 2024

(51) Int. Cl.
*G06F 1/00* (2006.01)
*G06F 9/50* (2006.01)
*G06F 11/30* (2006.01)

(52) U.S. Cl.
CPC ........ *G06F 11/3062* (2013.01); *G06F 9/5044* (2013.01)

(58) Field of Classification Search
CPC .............................. G06F 11/3062; G06F 9/5044
See application file for complete search history.

(56) References Cited

U.S. PATENT DOCUMENTS

| | | | | |
|---|---|---|---|---|
| 8,880,908 B2 * | 11/2014 | Brenneman | ........... | G06F 1/3225 713/300 |
| 11,507,271 B1 * | 11/2022 | R | ......................... | G06F 11/3034 |
| 2009/0316541 A1 * | 12/2009 | Takada | .................. | G06F 1/3221 369/47.5 |
| 2016/0313917 A1 * | 10/2016 | Xu | ....................... | G06F 11/3485 |
| 2020/0401326 A1 * | 12/2020 | Fujimoto | .............. | G06F 1/3225 |
| 2021/0303184 A1 * | 9/2021 | Palmer | .................. | G06F 3/0625 |
| 2022/0147273 A1 * | 5/2022 | Shin | ..................... | G06F 3/0659 |

* cited by examiner

*Primary Examiner* — Xuxing Chen
(74) *Attorney, Agent, or Firm* — McDermott Will & Emery LLP

(57) ABSTRACT

Managing power consumption for computing cluster, including for each IHS of the computing cluster: executing I/O computing workloads at the IHS associated with movement of block storage data, stored at a disk array in communication with the IHS, between the disk array and the IHS; during execution of the I/O computing workloads, determining an I/O power usage of the IHS; calculating an accumulated I/O power consumption of the plurality of IHS based on a summation of the I/O power usage of each of the IHS; during movement of the block storage data, calculating a power consumption of the disk array; calculating, for each IHS, a power storage consumption of the IHS based on the I/O power usage of the IHS, the accumulated I/O power consumption, and the power consumption of the disk array; allocating additional workloads among the plurality of IHS based on the power storage consumption of each IHS.

20 Claims, 3 Drawing Sheets

MANAGING POWER CONSUMPTION FOR A COMPUTING CLUSTER

BACKGROUND

Field of the Disclosure

The disclosure relates generally to managing power consumption for a computing cluster.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Block storage is an approach to data storage in which each storage volume acts as an individual hard drive that is configured by a storage administrator. In the block storage model, data is saved to the storage media in fixed-sized chunks called blocks. Each block is associated with a unique address. Block storage is often configured to decouple the data from the user's environment and spread it across multiple environments that can better serve the data. When data is requested, the underlying storage software reassembles the blocks of data from these environments and presents them back to the user.

SUMMARY

Innovative aspects of the subject matter described in this specification may be embodied in a method of managing power consumption for a computing cluster, including for each information handling system of a plurality of information handling systems of the computing cluster: executing input/output (I/O) computing workloads at the information handling system associated with movement of block storage data, stored at a disk array in communication with the information handling system, between the disk array and the information handling system; during execution of the I/O computing workloads at the information handling system, determining an I/O power usage of the information handling system; calculating an accumulated I/O power consumption of the plurality of information handling systems based on a summation of the I/O power usage of each of the information handling systems; during movement of the block storage data, calculating a power consumption of the disk array; calculating, for each information handling system of the plurality of information handling systems, a power storage consumption of the information handling system based on i) a ratio of the I/O power usage of the information handling system and the accumulated I/O power consumption and ii) the power consumption of the disk array; and allocating additional computing workloads among the plurality of information handling systems based on the power storage consumption of each of the information handling systems.

Other embodiments of these aspects include corresponding systems, apparatus, and computer programs, configured to perform the actions of the methods, encoded on computer storage devices.

These and other embodiments may each optionally include one or more of the following features. For instance, calculating, for each information handling system of the plurality of information handling systems, the power storage consumption of the information handling system includes multiplying the ratio of the I/O power usage of the information handling system and the accumulated I/O power consumption with the power consumption of the disk array. Determining, for each information handling system, the I/O power usage of the information handling system includes computing a utilization per second (CUPS) of the information handling system during execution of the I/O computing workload. For each information handling system of a plurality of information handling systems of the computing cluster: determining an idle power consumption of the information handling system; calculating the I/O power usage of the information handling system based on a difference of a current power usage of the information handling system and the idle power consumption. Ranking each of the information handling systems based on the power storage consumption of each of the information handling systems; identifying a particular information handling system of the plurality of information handling systems based on the ranking; and allocating the additional computing workload to the particular information handling system. Ranking each of the information handling systems includes ranking the each of the information handling systems based on a descending order of the power storage consumption of each of the information handling systems. Identifying the particular information handling system includes identifying a highest-ranked information handling system of the ranking.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
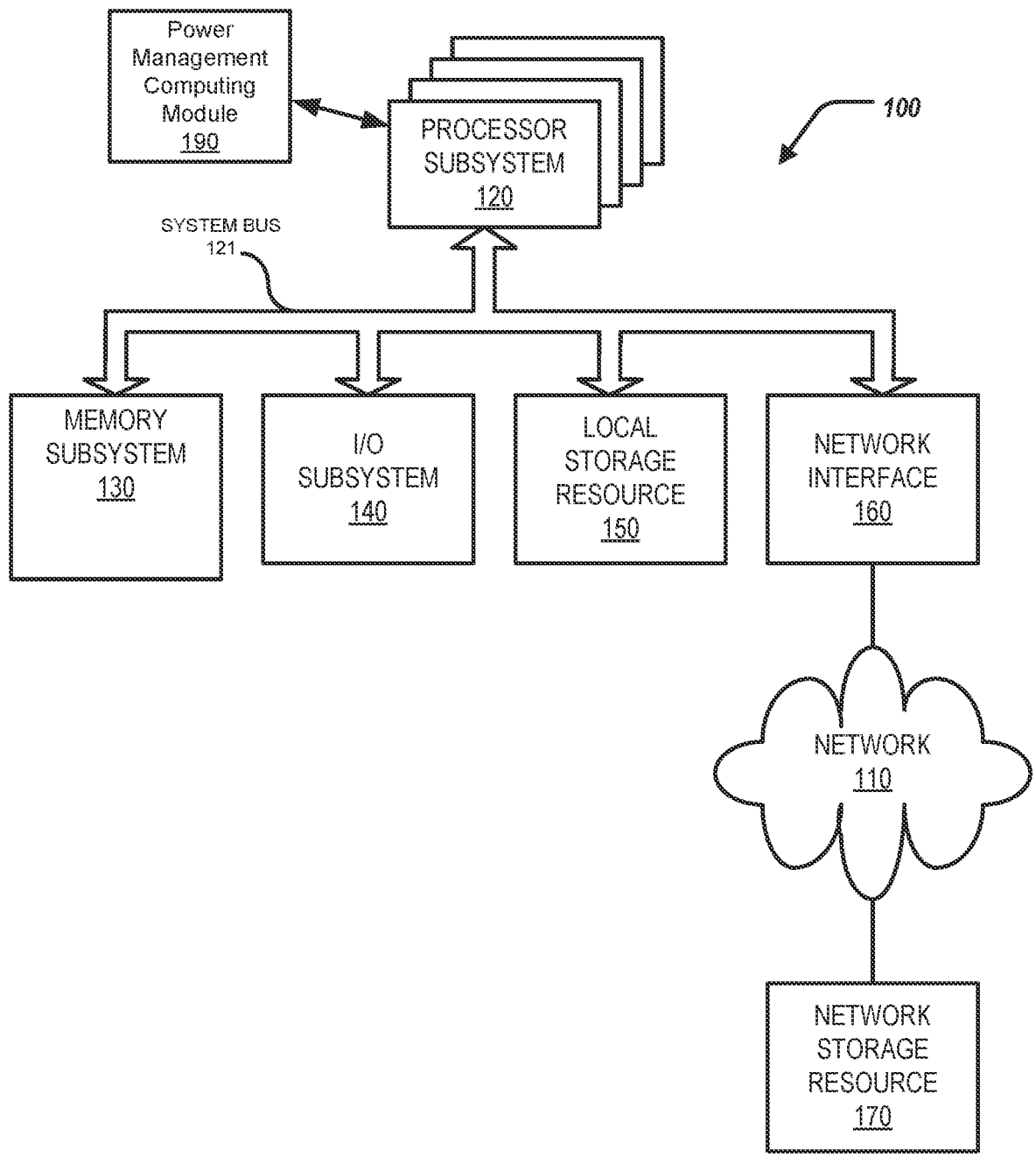
FIG. 1 is a block diagram of selected elements of an embodiment of an information handling system.

This disclosure discusses methods and systems for managing power consumption for a computing cluster. In short, a power storage consumption of an information handling system can be determined/calculated when the information handling system is executing input/output (I/O) computing workloads. The power storage consumption can be based on an I/O power usage (for executing I/O computing workloads), an accumulated I/O power consumption across multiple information handling systems of a cluster, and a power consumption of a disk array storage data retrieved by the information handling system. By determining such, a power headroom of each information handling system can be determined for allocation of additional computing workloads.

Specifically, this disclosure discusses a system and a method for managing power consumption for a computing cluster, including for each information handling system of a plurality of information handling systems of the computing cluster: executing input/output (I/O) computing workloads at the information handling system associated with movement of block storage data, stored at a disk array in communication with the information handling system, between the disk array and the information handling system; during execution of the I/O computing workloads at the information handling system, determining an I/O power usage of the information handling system; calculating an accumulated I/O power consumption of the plurality of information handling systems based on a summation of the I/O power usage of each of the information handling systems; during movement of the block storage data, calculating a power consumption of the disk array; calculating, for each information handling system of the plurality of information handling systems, a power storage consumption of the information handling system based on i) a ratio of the I/O power usage of the information handling system and the accumulated I/O power consumption and ii) the power consumption of the disk array; and allocating additional computing workloads among the plurality of information handling systems based on the power storage consumption of each of the information handling systems.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
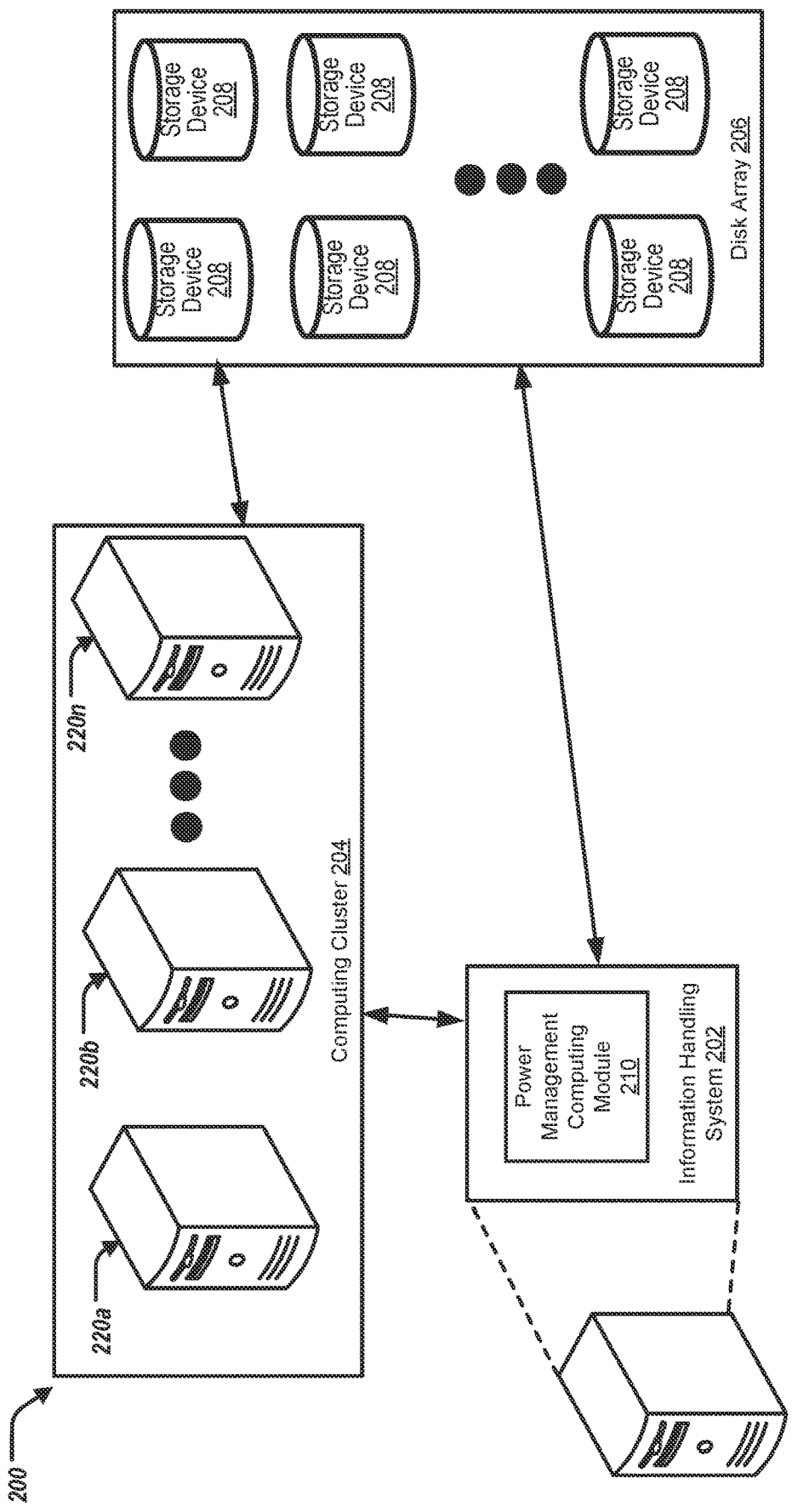
FIG. 2 illustrates a block diagram of a computing environment for managing power consumption for a computing cluster.
Figure 3:
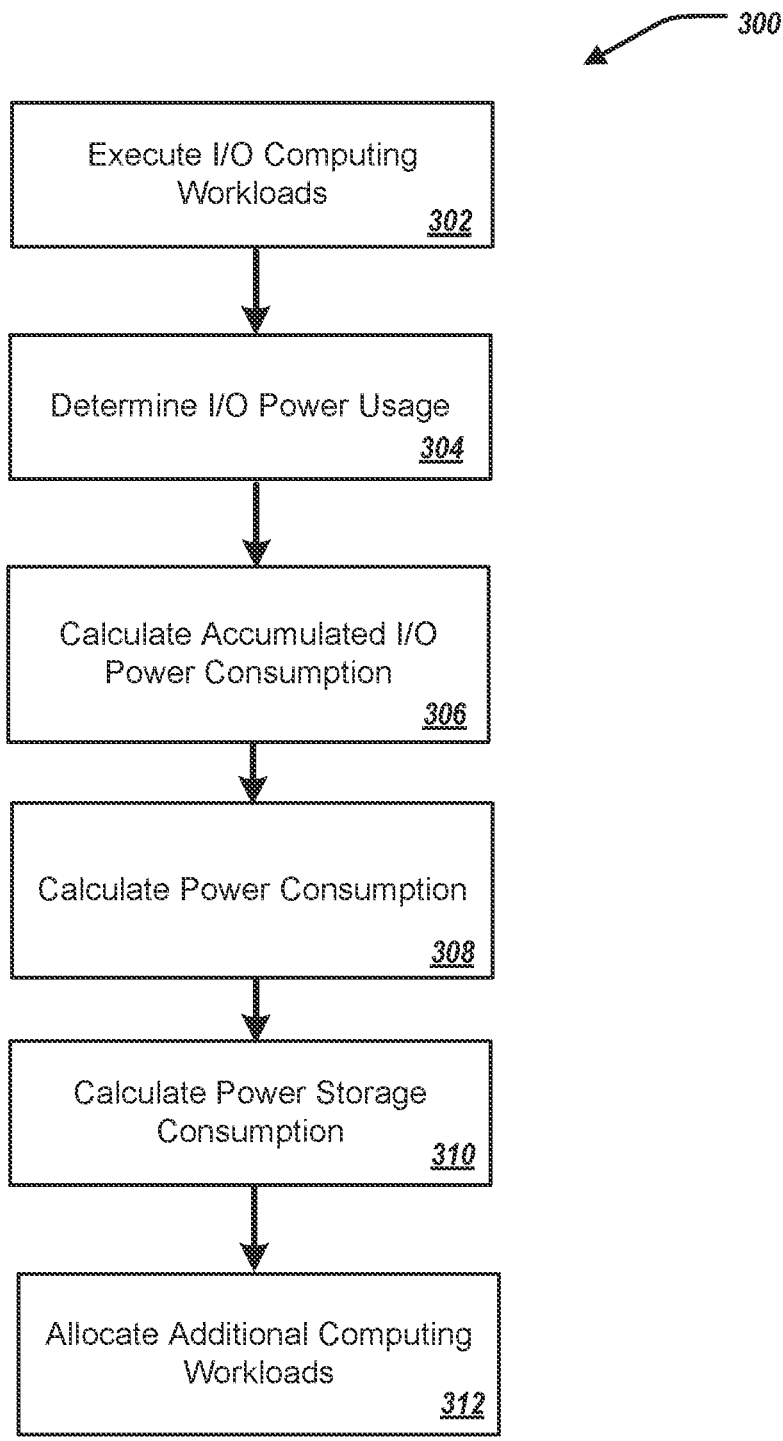
FIG. 3 illustrates a method for managing power consumption for a computing cluster.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, a I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a power management computing module 190. The power management computing module 190 can be included by the processor subsystem 120, or can be in communication with the processor subsystem 120.

In short, the power management computing module 190 can determine/calculate a power storage consumption of an information handling system when the information handling system is executing input/output (I/O) computing workloads. The power storage consumption can be based on an I/O power usage (for executing I/O computing workloads), an accumulated I/O power consumption across multiple information handling systems of a cluster, and a power consumption of a disk array storage data retrieved by the information handling system. By determining such, the power management computing module 190 can determine a power headroom of each information handling system for allocation of additional computing workloads.

Turning to FIG. 2, FIG. 2 illustrates an environment 200 including an information handling system 202, a computer cluster 204, and disk array 206. The information handling system 202 can include a power management computing module 210. In some examples, the information handling system 202 is similar to, or includes, the information handling system 100 of FIG. 1. In some examples, the power management computing module 210 is the same, or substantially the same, as the power management computing module 190 of FIG. 1.

The computer cluster 204 can include an information handling system 220a, 220b, . . . , 220n (collectively referred to as information handling systems 220).

The disk array 206 can include storage devices 208a, 208b, . . . , 208n (collectively referred to as storage devices 230).

The information handling system 202 can be in communication with the computing cluster 204 and the disk array 206. The computing cluster 204 can be in communication with the information handling system 202 and the disk array 206. The disk array 206 can be in communication with the computing cluster 204 and the information handling system 202. The disk array 206, and in particular the storage devices 208, can store block storage data. That is, one or more of the storage devices 208 can store data blocks of a larger file (or data record). Each data block can be associated with a unique address, and the address is the only metadata assigned to each data block.

In some examples, the power management computing module 210 can be included by one or more of the information handling systems 220. In some examples, the power management computing module 210 can be included by each of the information handling systems 220. In some examples, the power management computing module 210 can be included by one or more of the information handling systems 220 and the information handling system 202.

In some examples, one or more of the information handling systems 220 can include one or more virtual machines, or be considered a virtual machine. In some examples, each of the information handling systems 220 can include a computing cluster that includes multiple information handling systems.

To that end, the environment 200, and in particular, the power management computing module 210 can facilitate managing power consumption for the computing cluster 204, the disk array 206, or both. Specifically, for each information handling system 220 of the computing cluster 204, input/output (I/O) computing workloads can be executed at the information handling system 220. The I/O computing workloads can be associated with movement of the block storage data. In particular, the I/O computing workloads can be associated with the movement of the block storage data between the disk array 206 and the information handling system 220. For example, when the block storage data is stored at one or more of the storage devices 208, the information handling system 220 can execute input/output (I/O) computing workloads for accessing the block storage data, updating the block storage data, and/or storing the block storage data across one or more of the storage devices 208.

Furthermore, for each information handling system 220 of the computing cluster 204, during execution of the I/O computing workloads at the information handling system 220, the power management computing module 210 determines an I/O power usage (power consumption) of the information handling system 220. For example, when the information handling system 220 executes an I/O computing workload for access to data stored by the disk array 206, the information handling system 220 can provide data to the power management computing module 210 indicating the I/O power usage (power consumption) of the information handling system 220 associated with executing the I/O computing workload. In some examples, the information handling system 220 provides the data to the power management computing module 210 indicating the I/O power usage (power consumption) of the information handling system 220 associated with executing the I/O computing workload in response to a request from the power management computing module 210. In some examples, the information handling system 220 provides the data to the power management computing module 210 indicating the I/O power usage (power consumption) of the information handling system 220 associated with executing the I/O computing workload automatically and independent of a request from the power management computing module 210. In some examples, the information handling system 220 provides the data to the power management computing module 210 indicating the I/O power usage (power consumption) of the information handling system 220 associated with executing the I/O computing workload periodically (e.g., every 1 millisecond, 1 second, 1 minute, etc.).

In some examples, the power management computing module 210 can determine, for each information handling system 220, the I/O power usage of the information handling system 220 associated with executing the I/O computing workload, including computing a utilization per second (CUPS) of the information handling system 220 during execution of the I/O computing workload.

In some examples, the power management computing module 210 can determine, for each information handling system 220, an idle power consumption of the information handling system 220. That is, the idle power consumption (baseline power consumption) of the information handling system 220 is the power consumption of the information handling system 220 when not executing the I/O computing workload. Further, the power management computing module 210 can determine, for each information handling system 220, a current power usage of the information handling system 220. That is, the current power usage of the information handling system 220 can be the power consumption of the information handling system when executing the I/O computing workload (and other computing workloads that are not I/O specific computing workloads). Moreover, the management computing module 210 can, for each information handling system 220, calculate the I/O power usage of the information handling system 202 based on the current power usage of the information handling system 220 and the idle power consumption of the information handling system 220. Specifically, the management computing module 210 can, for each information handling system 220, calculate the I/O power usage of the information handling system 202 based on a difference between the current power usage of the information handling system 220 and the idle power consumption of the information handling system 220. For example, the management computing module 210 can, for each information handling system 220, calculate the I/O power usage of the information handling system 202 based on a value of the current power usage of the information handling system 220 minus a value of the idle power consumption of the information handling system 220.

The power management computing module 210 can calculate an accumulated I/O power consumption of the plurality of information handling systems 220. Specifically, the power management computing module 210 can calculate an accumulated I/O power consumption of the plurality of information handling systems 220 based on a summation of the I/O power usage of each of the information handling systems 220. That is, the power management computing module 210 can calculate an accumulated I/O power consumption of the plurality of information handling systems 220 as a summation of the I/O power usage of the information handling system 220a, the I/O power usage of the information handling system 220b, . . . , and the I/O power usage of the information handling system 220n.

The power management computing module 210, during movement of the block storage data, calculates a power consumption of the disk array 206. That is, during execution of the I/O computing workloads at the information handling system 220, the power management computing module 210 calculates a power consumption of the disk array 206. Specifically, when the information handling system 220 accesses the block storage data, updates the block storage data, and/or stores the block storage data across one or more of the storage devices 208, the power management computing module 210 calculates a power consumption of the disk array 206. For example, during movement of the block storage data, the power management computing module 210 can obtain data indicating the power consumption of the disk array 206. In some examples, during movement of the block storage data, the power management computing module 210 can obtain data indicating the power consumption of the disk array 206 automatically. In some examples, during movement of the block storage data, the power management computing module 210 can obtain data indicating the power consumption of the disk array 206 periodically (e.g., every 1 millisecond, 1 second, 1 minute, etc.).

The power management computing module 210, for each information handling system 220, calculates a power storage consumption of the information handling system 220. Specifically, the power management computing module 210, for each information handling system 220, calculates a power storage consumption of the information handling system 220 based on the I/O power usage of the information handling system 220, the accumulated I/O power consumption, and the power consumption of the disk array 206. That is, the power management computing module 210, for each information handling system 220, calculates a power storage consumption of the information handling system 220 based on i) a ratio of the I/O power usage of the information handling system and the accumulated I/O power consumption and ii) the power consumption of the disk array 206.

In some examples, the power management computing module 210, for each information handling system 220, calculates a power storage consumption of the information handling system 220 based on i) dividing a value of the I/O power usage of the information handling system 220 by a value of the accumulated I/O power consumption and ii) the power consumption of the disk array 206. In some examples, the power management computing module 210, for each information handling system 220, calculates a power storage consumption of the information handling system 220 based on the multiple of i) the ratio of the I/O power usage of the information handling system 220 and the accumulated I/O power consumption of the computing cluster 204 and ii) the power consumption of the disk array 206.

For example, for the information handling system 220a, the power storage consumption of the information handling system 220a is:

power storage consumption (220a)=[I/O power usage (220a)/accumulated I/O power consumption (204)]×power consumption (206).  [1]

The power management computing module 210 allocates additional computing workloads among the information handling systems 220 based on the power storage consumption of each of the information handling systems 220. For example, the power management computing module 210 can rank each of the information handling systems 220 in a list based on the power storage consumption of each of the information handling systems 220. That is, the power management computing module 210 can rank each of the information handling systems 220 in a list of descending order based on the power storage consumption of each of the information handling systems 220. For example, the information handling system 220 with the greatest power storage consumption is ranked at the bottom of the list (least amount of power headroom) while the information handling system 220 with the least power storage consumption is ranked at the top of the list (most amount of power headroom).

The power management computing module 210 identifies a particular information handling system 220 based on the ranking. For example, the power management computing module 210 identifies a particular information handling system 220 at a top (highest-ranked) of the ranking (top of the listing that indicates the information handling system 220 with the least power storage consumption and the most amount of power headroom). The power management computing module 210 allocates additional computing workloads to the particular information handling system 220.

In some examples, the power management computing module 210 identifies multiple particular information handling systems 220 based on the ranking. For example, the power management computing module 210 identifies the multiple particular information handling systems 220 at a top (highest-ranked) of the ranking (top of the listing that indicates the information handling systems 220 with the least power storage consumption and the most amount of power headroom). The power management computing module 210 allocates additional computing workloads to the multiple particular information handling systems 220.

In some examples, the power storage consumption of the information handling system 220 can be associated with any computing element of the information handling system 220, including such components as accelerator or FPGA.

FIG. 3 illustrates a flowchart depicting selected elements of an embodiment of a method 300 for managing power consumption for a computing cluster. The method 300 may be performed by the information handling system 100, the information handling system 202, and/or the power management computing module 210 and with reference to FIGS. 1-2. It is noted that certain operations described in method 300 may be optional or may be rearranged in different embodiments.

For each information handling system 220 of the computing cluster 204, input/output (I/O) computing workloads are executed at the information handling system 220 associated with movement of block storage data, at 302. In some examples, the block storage data is stored at the disk array 206. In some examples, the disk array 206 is in communication with the information handling system 220. In some examples, the movement of the block storage data is between the disk array 206 and the information handling system 220. During execution of the I/O computing workloads at the information handling system 202, the power management computing module 210 determines, for each information handling system 220 of the computing cluster 204, a I/O power usage of the information handling system 220, at 304. The power management computing module 210 calculates an accumulated I/O power consumption of the plurality of information handling systems 220 based on a summation of the I/O power usage of each of the information handling systems 220, at 306. During movement of the block storage data, the power management computing module 210 calculates a power consumption of the disk array 206, at 308. The power management computing module 210 calculates, for each information handling system 220, a power storage consumption of the information handling system 220 based on i) a ratio of the I/O power usage of the information handling system 220 and the accumulated I/O power consumption of the computing cluster 204 and ii) the power consumption of the disk array 208, at 310. The power management computing module 210 allocates additional computing workloads among the plurality of information handling systems 220 based on the power storage consumption of each of the information handling systems 220, at 312.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing power consumption for a computing cluster, the method comprising:
   for each information handling system of a plurality of information handling systems of the computing cluster:
      executing input/output (I/O) computing workloads at the information handling system associated with movement of block storage data, stored at a disk array in communication with the information handling system, between the disk array and the information handling system;
      during execution of the I/O computing workloads at the information handling system, determining an I/O power usage of the information handling system;
   calculating an accumulated I/O power consumption of the plurality of information handling systems based on a summation of the I/O power usage of each of the information handling systems;
   during movement of the block storage data, calculating a power consumption of the disk array;
   calculating, for each information handling system of the plurality of information handling systems, a power storage consumption of the information handling system based on i) a ratio of the I/O power usage of the information handling system and the accumulated I/O power consumption and ii) the power consumption of the disk array; and
   allocating additional computing workloads among the plurality of information handling systems based on the power storage consumption of each of the information handling systems.

2. The computer-implemented method of claim 1, wherein calculating, for each information handling system of the plurality of information handling systems, the power storage consumption of the information handling system includes multiplying the ratio of the I/O power usage of the information handling system and the accumulated I/O power consumption with the power consumption of the disk array.

3. The computer-implemented method of claim 1, wherein determining, for each information handling system, the I/O power usage of the information handling system includes computing a utilization per second (CUPS) of the information handling system during execution of the I/O computing workload.

4. The computer-implemented method of claim 1, further comprising:
   for each information handling system of a plurality of information handling systems of the computing cluster:
      determining an idle power consumption of the information handling system;
      calculating the I/O power usage of the information handling system based on a difference of a current power usage of the information handling system and the idle power consumption.

5. The computer-implemented method of claim 1, further comprising:
   ranking each of the information handling systems based on the power storage consumption of each of the information handling systems;
   identifying a particular information handling system of the plurality of information handling systems based on the ranking; and
   allocating the additional computing workload to the particular information handling system.

6. The computer-implemented method of claim 5, wherein ranking each of the information handling systems includes ranking the each of the information handling systems based on a descending order of the power storage consumption of each of the information handling systems.

7. The computer-implemented method of claim 6, wherein identifying the particular information handling system includes identifying a highest-ranked information handling system of the ranking.

8. An information handling system comprising a processor having access to memory media storing instructions executable by the processor to perform operations, comprising:
   for each information handling system of a plurality of information handling systems of the computing cluster:
      executing input/output (I/O) computing workloads at the information handling system associated with movement of block storage data, stored at a disk array in communication with the information handling system, between the disk array and the information handling system;
      during execution of the I/O computing workloads at the information handling system, determining an I/O power usage of the information handling system;
   calculating an accumulated I/O power consumption of the plurality of information handling systems based on a summation of the I/O power usage of each of the information handling systems;
   during movement of the block storage data, calculating a power consumption of the disk array;
   calculating, for each information handling system of the plurality of information handling systems, a power storage consumption of the information handling system based on i) a ratio of the I/O power usage of the information handling system and the accumulated I/O power consumption and ii) the power consumption of the disk array; and
   allocating additional computing workloads among the plurality of information handling systems based on the power storage consumption of each of the information handling systems.

9. The information handling system of claim 8, wherein calculating, for each information handling system of the plurality of information handling systems, the power storage consumption of the information handling system includes multiplying the ratio of the I/O power usage of the information handling system and the accumulated I/O power consumption with the power consumption of the disk array.

10. The information handling system of claim 8, wherein determining, for each information handling system, the I/O power usage of the information handling system includes computing a utilization per second (CUPS) of the information handling system during execution of the I/O computing workload.

11. The information handling system of claim 8, the operations further comprising:
for each information handling system of a plurality of information handling systems of the computing cluster:
determining an idle power consumption of the information handling system;
calculating the I/O power usage of the information handling system based on a difference of a current power usage of the information handling system and the idle power consumption.

12. The computer-implemented method of claim 8, the operations further comprising:
ranking each of the information handling systems based on the power storage consumption of each of the information handling systems;
identifying a particular information handling system of the plurality of information handling systems based on the ranking; and
allocating the additional computing workload to the particular information handling system.

13. The information handling system of claim 12, wherein ranking each of the information handling systems includes ranking the each of the information handling systems based on a descending order of the power storage consumption of each of the information handling systems.

14. The information handling system of claim 13, wherein identifying the particular information handling system includes identifying a highest-ranked information handling system of the ranking.

15. A non-transitory computer-readable medium storing software comprising instructions executable by one or more computers which, upon such execution, cause the one or more computers to perform operations comprising:
for each information handling system of a plurality of information handling systems of the computing cluster:
executing input/output (I/O) computing workloads at the information handling system associated with movement of block storage data, stored at a disk array in communication with the information handling system, between the disk array and the information handling system;
during execution of the I/O computing workloads at the information handling system, determining an I/O power usage of the information handling system;
calculating an accumulated I/O power consumption of the plurality of information handling systems based on a summation of the I/O power usage of each of the information handling systems;
during movement of the block storage data, calculating a power consumption of the disk array;
calculating, for each information handling system of the plurality of information handling systems, a power storage consumption of the information handling system based on i) a ratio of the I/O power usage of the information handling system and the accumulated I/O power consumption and ii) the power consumption of the disk array; and
allocating additional computing workloads among the plurality of information handling systems based on the power storage consumption of each of the information handling systems.

16. The non-transitory computer-readable medium of claim 15, wherein calculating, for each information handling system of the plurality of information handling systems, the power storage consumption of the information handling system includes multiplying the ratio of the I/O power usage of the information handling system and the accumulated I/O power consumption with the power consumption of the disk array.

17. The non-transitory computer-readable medium of claim 15, wherein determining, for each information handling system, the I/O power usage of the information handling system includes computing a utilization per second (CUPS) of the information handling system during execution of the I/O computing workload.

18. The non-transitory computer-readable medium of claim 15, the operations further comprising:
for each information handling system of a plurality of information handling systems of the computing cluster:
determining an idle power consumption of the information handling system;
calculating the I/O power usage of the information handling system based on a difference of a current power usage of the information handling system and the idle power consumption.

19. The non-transitory computer-readable medium of claim 15, the operations further comprising:
ranking each of the information handling systems based on the power storage consumption of each of the information handling systems;
identifying a particular information handling system of the plurality of information handling systems based on the ranking; and
allocating the additional computing workload to the particular information handling system.

20. The non-transitory computer-readable medium of claim 19, wherein ranking each of the information handling systems includes ranking the each of the information handling systems based on a descending order of the power storage consumption of each of the information handling systems.

* * * * *